(12) United States Patent
Lyssy (10) Patent No.: US 11,524,756 B2
(45) Date of Patent: Dec. 13, 2022

(54) OCEAN BOTTOM NODE DEPLOYMENT (71) Applicant: PGS Geophysical AS, Oslo (NO)

(72) Inventor: Matthew E. Lyssy, Houston, TX (US)

(73) Assignee: PGS Geophysical AS, Oslo (NO)

( * ) Notice: Subject to any disclaimer, the term of this patent is extended or adjusted under 35 U.S.C. 154(b) by 436 days.

(21) Appl. No.: 16/551,864

(22) Filed: Aug. 27, 2019

(65) Prior Publication Data

US 2020/0062359 A1 Feb. 27, 2020

Related U.S. Application Data

(60) Provisional application No. 62/833,924, filed on Apr. 15, 2019, provisional application No. 62/723,019, filed on Aug. 27, 2018.

(51) Int. Cl.
*B63G 8/00* (2006.01)
*G01V 1/38* (2006.01)

(52) U.S. Cl.
CPC ............ *B63G 8/001* (2013.01); *G01V 1/3808* (2013.01); *G01V 1/3852* (2013.01); *G01V 2210/1427* (2013.01)

(58) Field of Classification Search
CPC .... B63G 8/001; G01V 1/3808; G01V 1/3852; G01V 2210/1427
See application file for complete search history.

(56) References Cited

U.S. PATENT DOCUMENTS

| | | | |
|---|---|---|---|
| 6,009,042 A * | 12/1999 | Workman | G01V 1/20 114/244 |
| 7,990,803 B2 | 8/2011 | Ray et al. | |
| 8,619,496 B2 * | 12/2013 | Hartland | G01V 1/3808 114/253 |
| 10,209,382 B2 | 2/2019 | Mcmillian et al. | |
| 2008/0253225 A1 * | 10/2008 | Welker | G01V 1/3835 367/17 |
| 2016/0041284 A1 | 2/2016 | Rokkan et al. | |
| 2016/0187516 A1 * | 6/2016 | Brenders | G01V 1/005 367/15 |
| 2016/0245945 A1 | 8/2016 | Rokkan et al. | |
| 2017/0082763 A1 | 3/2017 | Rokkan et al. | |
| 2017/0203815 A1 * | 7/2017 | Dudley | G01V 1/3843 |
| 2018/0100940 A1 | 4/2018 | Rokkan et al. | |
| 2019/0004961 A1 | 1/2019 | Boggs et al. | |

FOREIGN PATENT DOCUMENTS

CA 2581193 A1 * 4/2006 .......... G01V 1/3808

* cited by examiner

*Primary Examiner* — Ian J Lobo (57) ABSTRACT

A system for ocean bottom node (OBN) deployment can include a first deployment device located on a marine vessel, a second deployment device located on the marine vessel, a first line coupled to the first deployment device and comprising a first plurality of OBNs, and a second line coupled to the second deployment device and comprising a second plurality of OBNs. The first deployment device and the second deployment device can be configured to deploy and retract the first line and the second line simultaneously.

21 Claims, 6 Drawing Sheets

OCEAN BOTTOM NODE DEPLOYMENT

CROSS-REFERENCE TO RELATED APPLICATIONS

This application claims priority to U.S. Provisional Application 62/723,019 filed Aug. 27, 2018 and U.S. Provisional Application 62/833,924 filed Apr. 25, 2019, which is hereby incorporated by reference as if entirely set forth herein.

BACKGROUND

In the past few decades, the petroleum industry has invested heavily in the development of marine survey techniques that yield knowledge of subterranean formations beneath a body of water in order to find and extract valuable resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed for deposits. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave that travels down through the water and into the subterranean formation. At each interface between different types of rock, a portion of the wave may be refracted, and another portion may be reflected, which may include some scattering, back toward the body of water to propagate toward the sea surface. The receivers thereby measure a wave that was initiated by the actuation of the source.

DETAILED DESCRIPTION

This disclosure is related generally to the field of marine surveying. Marine surveying can include, for example, seismic and/or electromagnetic surveying, among others. For example, this disclosure may have applications in marine surveying, in which one or more source elements are used to generate wavefields, and receivers, for instance ocean bottom receivers, receive energy generated by the source elements and affected by the interaction with a subsurface formation. The receivers thereby collect survey data, which can be useful in the discovery and/or extraction of hydrocarbons from subsurface formations.

Ocean bottom acquisition is a marine seismic acquisition approach including receivers located on the ocean bottom. Ocean bottom acquisition can include the use of ocean bottom cables (OBCs) or ocean bottom nodes (OBNs). OBCs are positioned by a receiver vessel and may remain coupled to the receiver vessel during acquisition. OBCs are more commonly used in shallower acquisitions, while OBNs are free positioned and can be used for deeper acquisitions. For example, OBCs work in shallow water areas, usually less than one kilometer in depth, while OBNs can be applied in the water from tens of meters to thousands of meters deep. The term "ocean bottom" as used herein includes the bottom of any body of water and is not limited to oceans.

In some approaches to marine seismic surveying, OBN deployment includes deploying OBNs tethered together in a single line from a reel. Such a line is distinguished herein from an OBC in that the line does not remain coupled to the receiver vessel and that the line is coupled to OBNs. Single lines are deployed one at a time until multiple lines of OBNs have been laid out side-by-side such that a two-dimensional (2D) grid of OBNs is formed for seismic acquisitions. Because each line is laid out separately, such deployment approaches may result in non-uniform spacing of OBNs, which decreases efficiency and stability of the spread of OBNs. For instance, the data received and recorded by receivers on the OBNs may be less accurate and more inconsistent than data collected form OBNs deployed in accordance with the present disclosure.

At least one embodiment of the present disclosure improves the stability and consistency of a spread of OBNs and increases the efficiency of deployment of OBNs, speed of deployment of OBNs, recovery of OBNs, or combinations thereof by utilizing a marine vessel to deploy a plurality of lines of OBNs simultaneously. A spread of OBNs, as used herein, includes lines of OBNs in a grid-like pattern. The spread, in at least one embodiment, includes a grid of OBNs, such as a 2D grid of OBNs. Simultaneous deployment, as used herein, includes deployment occurring at the same or substantially the same time. Substantially the same time includes deployment within a threshold period of time. The lines of OBNs can be deployed and recovered from a deck of a marine vessel. The lines of OBNs can be deployed with more uniform spacing as compared to other approaches so as to form a 2D grid of the OBNs. Once deployed, the 2D grid of the OBN can be a "carpet" of OBNs such that the floor of a fluid volume is "carpeted" or covered with an expanse or layer of OBNs. The floor of the fluid volume, in at least one embodiment, is an ocean bottom. The fluid volume, as used herein, includes space occupied by a fluid such as water. For instance, the fluid volume may include a seawater volume such as the ocean or a freshwater volume such as a freshwater lake.

At least one embodiment of the present disclosure includes prearranging a line of OBNs into a 2D grid of the OBNs and reeling the 2D grid of the OBNs onto one or more deployment devices, such as reels, prior to deployment of the OBNs. The reel(s) can be located on the deck of a marine vessel. To deploy the assembly of the prearranged lines of OBNs into the fluid volume, the prearranged lines of OBNs can be unreeled from the reel(s) into the fluid volume. Because the OBNs are deployed as an assembly of a prearranged lines of OBNs, the deployment of the OBNs can be performed more quickly and efficiently than some previous approaches.

At least one embodiment of the present disclosure includes coupling tethers to the lines of OBNs at particular intervals along the lines of OBNs during deployment so as to form a 2D grid of the OBNs as the lines of OBNs are unwound from a plurality of deployment devices such as reels. For instance, tethers can couple adjacent lines of OBNs to one another to maintain a distance between the adjacent lines. Tethers may be coupled between two lines of OBNs, between and among more than two lines of OBNs, or some combination thereof. Subsequent to deployment of the 2D grid of OBNs into the fluid volume, a force can be applied to one or more of the lines of OBNs of the 2D grid to pull the lines taut to create a substantially uniform spread of the OBNs. As used herein, a substantially uniform spread includes a spread having OBNs a comparative distance from one another within a particular threshold.

In at least one embodiment the force can be applied to the lines or tethers by one or more spreading apparatuses, including marine vessels acting as "carpet stretchers" or paravanes associated with the marine vessel. In at least one embodiment, a combination of marine vessels and paravanes may be used to pull the lines, tethers, or both taut. For instance, a force can be applied to four sides of the spread to achieve the uniform spread. In such an example, marine vessels and paravanes pull the sides of the spread, while a chase vessel or drag device pulls the rear of the spread and the marine vessel pulls the front. Together, a uniform spread is maintained.

It is to be understood that the present disclosure is not limited to particular devices or methods, which may, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. For example, 118 may reference element "18" in FIG. 1, and a similar element may be referenced as 218 in FIG. 2. Multiple analogous elements within one figure may be referenced with a reference numeral followed by a hyphen and another numeral or a letter. For example, 222-1 may reference element 22-1 in FIGS. 2 and 222-2 may reference element 22-2, which can be analogous to element 22-1. Such analogous elements may be generally referenced without the hyphen and extra numeral or letter. For example, elements 222-1 and 222-2 may be generally referenced as 222. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
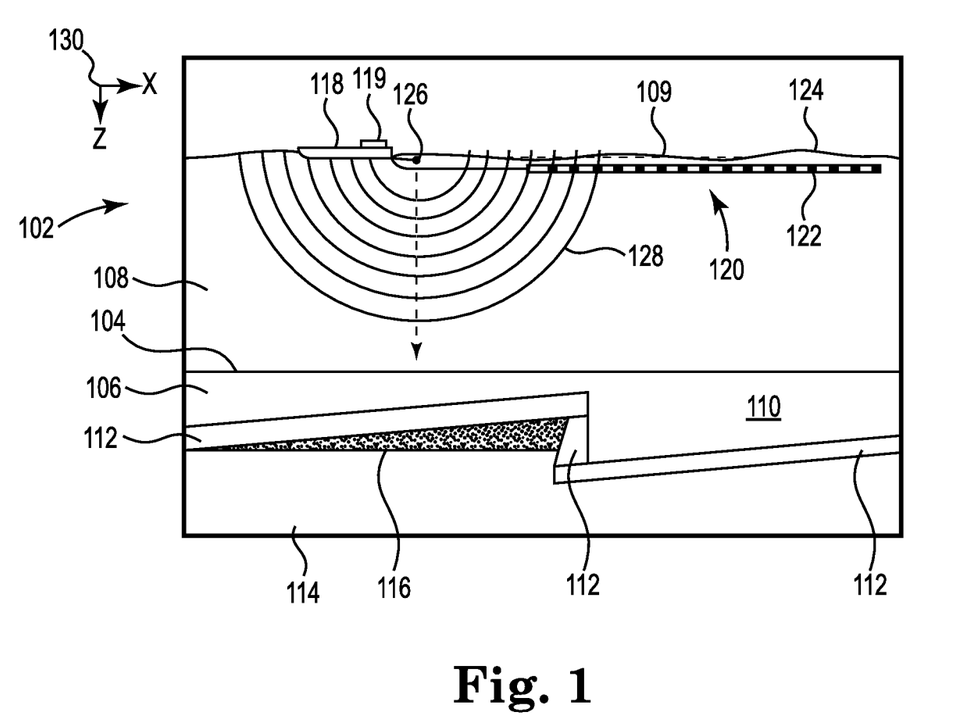
FIG. 1 is an elevation or xz-plane view of an example marine seismic survey in which signals are emitted by a source for recording by receivers.

FIG. 1 is an elevation or xz-plane 130 view of an example marine seismic survey in which signals are emitted by a source 126 for recording by receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, underlying rock layer 114, and hydrocarbon-saturated layer 116. One or more elements of the subsurface volume 106, such as the first sediment layer 110 and the uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which receivers may be coupled. In one type of marine survey, each receiver, such as receiver 122, comprises an electromagnetic receiver that detects electromagnetic energy within the water. The streamers 120 and the marine survey vessel 118 can include sensing electronics and data-processing facilities that allow receiver readings to be correlated with absolute positions on the sea surface and absolute three-dimensional positions with respect to a three-dimensional coordinate system. In FIG. 1, the receivers along the streamers are shown to lie below the sea surface 109, with the receiver positions correlated with overlying surface positions, such as a surface position 124 correlated with the position of receiver 122. The marine survey vessel 118 can include a controller 119, which can be used for operations associated with OBN deployment as described herein.

The marine survey vessel 118 can tow one or more sources 126 that produce signals as the marine survey vessel 118 and streamers 120 move across the sea surface 109. Although not specifically illustrated, the sources 126 can include a plurality of marine non-impulsive sources above, below, or in-line with the streamer 120. Sources 126 and/or streamers 120 may also be towed by other vessels or may be otherwise disposed in fluid volume 108. For example, receivers may be located on OBCs or nodes fixed at or near the surface 104, and sources 126 may also be disposed in a nearly-fixed or fixed configuration.

FIG. 1 shows acoustic energy illustrated as an expanding, spherical signal, illustrated as semicircles of increasing radius centered at the source 126, representing a down-going wavefield 128, following a signal emitted by the source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Although FIG. 1 illustrates that a marine survey vessel 118 is towing a streamer 120 with a number of seismic receivers, embodiments are not so limited and can include the use of seismic receivers that are fixed or releasably adhered to a bottom of the fluid volume, such as a nodal system, a line system, or an OBC system as described herein. A line system can include, for instance, seismic receivers spaced along a line, and data can be recorded by the seismic receivers in OBNs along the line for later retrieval and processing. In at least one embodiment, both streamers and lines can be used to record data to be processed according to the present disclosure.

Figure 2:
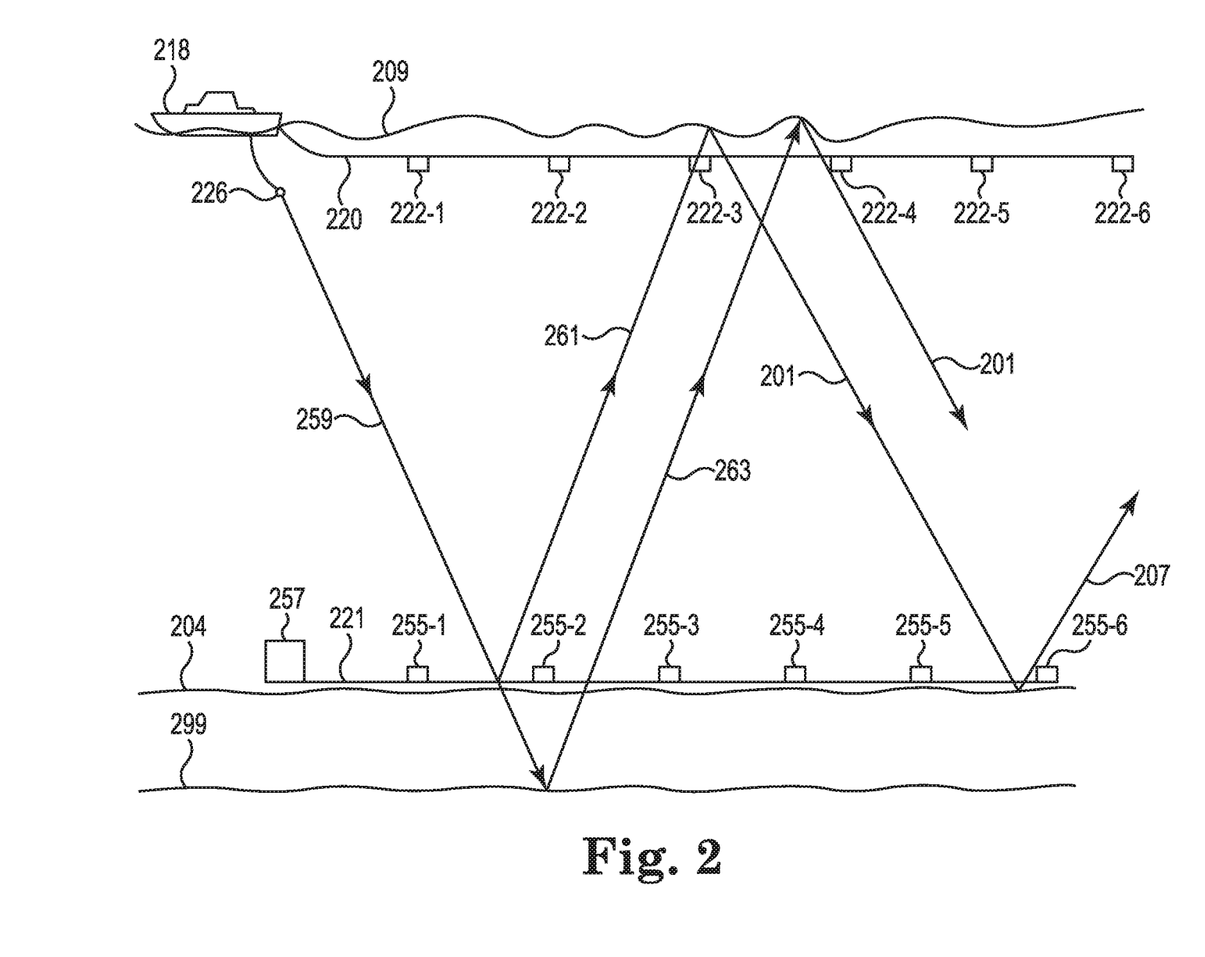
FIG. 2 is an elevation view of another example marine seismic survey in which signals are emitted by a source for recording by receivers.

FIG. 2 is an elevation view of another example marine seismic survey in which signals are emitted by a source 226 for recording by receivers 222. A single seismic streamer 220 and a single line 221 are illustrated in FIG. 2 for clarity; however, at least one embodiment of the present disclosure includes three-dimensional acquisition techniques, in which more than one seismic source and/or laterally spaced streamers and/or lines are used to acquire seismic data.

As illustrated in FIG. 2, marine survey vessel 218 can tow a source 226 that can be actuated at selected times. In some examples, a streamer 220 is also towed by the marine survey vessel 218. The streamer 220 includes receivers 222-1, . . . , 222-6 at spaced apart locations along the streamer 220. Any number of receivers 222 can be used. Each receiver 222 can include a sensor such as, for example, a hydrophone that is responsive to the pressure in the water or to changes in pressure, such as, for instance, changes in pressure with respect to time, or an accelerometer that is sensitive to particle motion or changes in particle motion. At least one embodiment of the present disclosure can include both hydrophones and accelerometers.

In at least one embodiment, a line 221 can be deployed on the surface 204. The line 221 can include, for instance, ocean bottom nodes (OBN) 255-1, 255-2, 255-3, 255-4, 255-5, 255-6 spaced along the line 221. Any number of OBNs can be used. An OBN, in at least one embodiment, comprises a node housing a receiver to receive seismic signals. Signals received by the receivers of the OBNs 255 can be recorded by a recording unit 257 for later retrieval and processing. In some examples, both streamers and lines of OBNs can be used to record signals to be processed according to the present disclosure. At least one embodiment of the present disclosure includes lines of OBNs 255 deployed via a deployment device or devices onboard the marine survey vessel 218 and sunk to the surface 204.

When the source 226 is actuated, acoustic energy travels downwardly, as shown at 259. Some of the downwardly traveling energy 259 penetrates the surface 204 and reaches a subsurface layer boundary 299. Acoustic energy can be reflected from the layer boundary 299, whereupon the reflected energy travels upwardly, as shown generally at 263. Acoustic energy can also be reflected from the surface 204, whereupon the reflected energy travels upwardly, as shown generally at 261. The upwardly traveling acoustic energy 261, 263 can be detected by either or both of receivers 222 on the streamer 220 and the receivers of OBNs 255 on the line 221 on the surface 204. The upwardly traveling energy 261, 263 can reflect from the sea surface 209, whereupon the energy travels downwardly again, as shown at 201. The sea surface reflected energy 201 can be detected by the receivers 205 (and/or those on OBNs 255) resulting in a ghost signal. The sea surface reflected energy 201 also may be reflected from the surface 204, and becomes upwardly traveling energy, shown generally at 207. Further, acoustic energy can reflect from the sea surface (down-going energy 201) and can again reflect from the ocean bottom (up-going energy 207) a plurality of times, resulting in water-layer multiple reflections. Although not specifically illustrated, shear waves in the solid volume underlying the surface 204 can be received by the OBNs 255 along the line 251.

Figure 3:
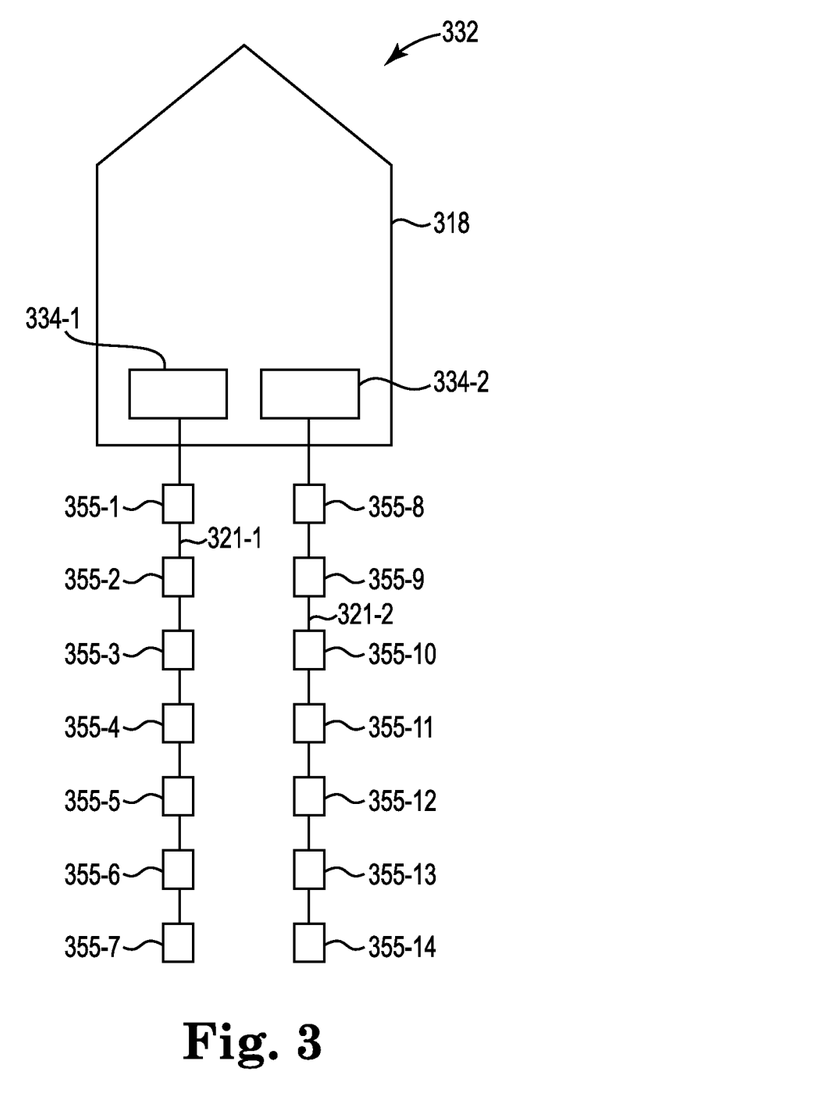
FIG. 3 is an exemplary embodiment of a system for ocean bottom node (OBN) deployment using deployment devices located on a marine vessel.

FIG. 3 is an exemplary embodiment of a system 332 for OBN 355 deployment using deployment devices 334 located on a marine vessel 318. Marine vessel 318 includes a first deployment device 334-1 and a second deployment device 334-2. OBNs 355, in at least one embodiment, include acoustic positioning capabilities such that relative positions of each of the first and the second plurality of OBNs 355 is known or can be determined during signal recording. Deployment devices 334, in at least one embodiment, include reels configured to deploy and retract the lines 321 of OBNs 355 and are located at or near the rear of marine vessel 318. Deploying, as used herein, includes putting into positions the lines 321, for instance by spreading, sending, and/or releasing the lines into the fluid volume. Retracting, as used herein, includes returning the lines, for instance by reeling them back to the marine vessel 318 via reels. Deployment devices other than reels may be used in at least one embodiment. While two deployment devices 334 are illustrated in FIG. 3, more or fewer deployment devices may be present on the marine vessel 318.

The system 332 includes a first line 321-1 comprising a first plurality of OBNs 355-1, 355-2, 355-3, 355-4, 355-5, 355-6, 355-7 configured to be deployed and retracted via first deployment device 334-1. While seven OBNs are illustrated on the first line 321-1, more or fewer OBNs may be present. The system 332 includes a second line 321-2 comprising a second plurality of OBNs 355-8, 355-9, 355-10, 355-11, 355-12, 355-13, 355-14 configured to be deployed and retracted via the second deployment device 334-2. While seven OBNs are illustrated on the first line 321-2, more or fewer OBNs may be present. In at least one embodiment, the first line 321-1 is deployed into a fluid volume, and the second line 321-2 is deployed in the fluid volume simultaneously. For instance, the deployment devices 334 deploy the lines 321 simultaneously, such that the first OBN 355-7 on the first line 321-1 and the first OBN 355-14 on the second line 321-2 reach the fluid volume at substantially the same time, as do each successive pair of the remaining OBNs. As used herein, substantially the same time includes a comparative time frame within a particular threshold.

By deploying the lines 321 simultaneously, the spread of the grid of OBNs 355 is consistent, and OBNs 355 remain a desired distance from each other. For example, a particular OBN 355-4 remains a desired distance from adjacent inline OBNs 355-3, 355-5, and adjacent crossline OBNs 355-11, which results in more accurate and efficient data acquisition. In addition, in at least one embodiment of the present disclosure, in contrast to other approaches that deploy a single line of OBNs at a time, a plurality of lines 321 of OBNs 355 are deployed from the plurality of deployment devices 334 resulting in faster and more efficient deployment of OBNs. Further, though not illustrated in FIG. 3, tethers may be coupled to the lines 321 to maintain the spread of the grid of OBNs 355 during deployment, allowing for a more stable spread. For instance, the tethers may keep the lines 321 from having a separation distance above or below a desired threshold.

In at least one embodiment, the marine vessel 318 is a marine survey vessel that has deck wide enough to facilitate a plurality of deployment devices 334 such as reels used to deploy streamers for towed streamer acquisition. A wider deck can facilitate more deployment devices 334 or larger deployment devices 334. For instance, the wider deck may house sixteen standard-sized streamer deployment devices 334, two large deployment devices 334, or one very large deployment device 334. Other numbers or size combinations of deployment devices 334 are possible. Example deck widths may be 100 meters or more. In at least one embodiment of the present disclosure, the deployment devices are utilized to deploy OBNs 355 as described herein. Such a marine vessel 318, which may have been designed for operation with streamers, can advantageously be used for deployment of a grid of OBNs 355 due to the width of the deck provided for deployment and retrieval of streamers. While wide decks can facilitate more efficient deployment, embodiments are not limited to use on wide decks. Some embodiments of deployment devices 334 can be used on narrower decks such as, for example, decks that are less than 100 meters wide. Some embodiments can be used on decks that are 20-40 meters wide. At least one embodiment of the present disclosure can make use of existing infrastructure, such as a marine survey vessel, for deployment and retrieval of a grid of OBNs 355.

By utilizing the wide deck, a wider grid of OBNs 355 is deployed as compared to other OBN deployment approaches, resulting in a wider coverage area and more efficient acquisition. For example, a marine vessel 318 with a wide deck may have a plurality of deployment devices 334, for instance sixteen deployment devices 334 staggered along the wide deck, for deployment of towed streamers. In such an example, two to sixteen lines 321 of OBNs 355 may be deployed at one time. Lines 321 of OBNs 355 may be deployed via those two to sixteen deployment devices 334, with deployment including reeling out the lines 321, tethering the lines 321, sinking the lines 321, and spreading the lines 321, as will be discussed further herein. More or fewer deployment devices 334 may be present on the deck, and all or some of the deployment devices 334 may be used for deployment of the lines 321 of OBNs 355.

In another embodiment, one or two larger deployment devices 334 may be used to deploy a grid of lines 321 of OBNs 355 having tethers already attached. For instance, a "carpet" of OBNs may be deployed via the one or two larger deployment devices 334. Such a carpet includes a preassembled grid of lines, OBNs, and tethers on the larger deployment devices 334. The carpet can be in a storage configuration, with tethers are already coupled to the lines, so that further coupling of tethers is not necessary when deploying the carpet. In embodiments, the storage configuration can include have some of the tethers already coupled to the lines 321, and additional tethers can be attached during deployment. In at least one embodiment, lines 321 of OBNs 355 can be reeled onto existing towed streamer acquisition deployment devices. In such an example, lines of OBNs are deployed via the existing deployment devices and tethers are coupled to the lines housing the OBNs during deployment.

Figure 4:
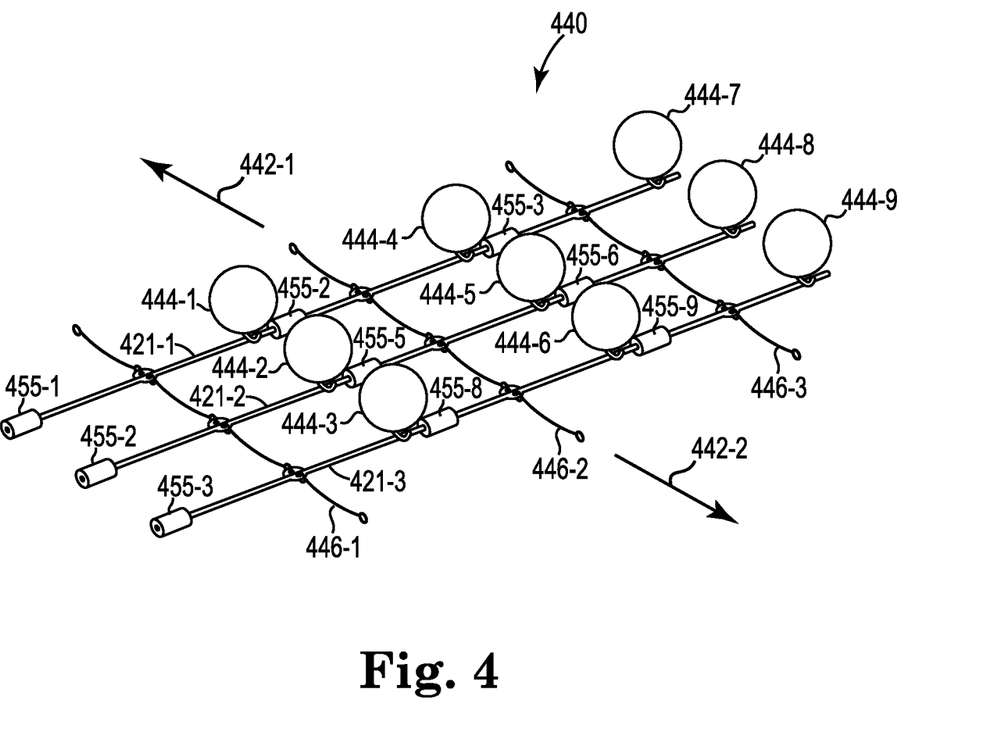
FIG. 4 is an exemplary embodiment of a system for OBN deployment including tethers and floatation devices.

FIG. 4 is an exemplary embodiment of a system 440 for OBN 455 deployment including tethers 446 and floatation devices 444. System 440 includes lines 421 deployed from deployment devices of a marine vessel. While not illustrated in FIG. 4, the marine vessel may be located in the lower left-hand corner of the page traveling down and to the left. System 440 includes lines 421 with OBNs 455 and floatation devices 444 coupled thereto. Also included in system 440 are spreading apparatuses 442 to tension and maintain the spread of the system 440.

In at least one embodiment of the present disclosure, deployment of a 2D grid of OBNs 455 includes the use of lines 421-1, 421-2, 421-3 that are configured to sink in a fluid volume. For example, the lines 421 can be negatively buoyant, such that when the floatation devices 444 are not inflated, the lines 421 can sink in the fluid volume. In at least one embodiment, lines 421 are not configured to sink but may be forced to sink through other means such as weights coupled to the lines 421 or the tethers 446 or a marine vessel to pull the lines 421 to an ocean bottom. While three lines 421 are illustrated, more or fewer lines 421 may be present. Each of the lines 421 includes a plurality of OBNs 455-1, 455-2, 455-3, 455-4, 455-5, 455-6, 455-7, 455-8, 455-9. While three OBNs 455 are illustrated on each line 421, more or fewer OBNs may be present.

Prior to deployment, the lines 421 can be reeled onto reels or other deployment devices of a marine vessel. When the marine vessel is in position for deployment of the OBNs 455, the lines 421 can be payed out. As the lines 421 leave the deck of the marine vessel, a plurality of tethers 446-1, 446-2, 446-3 can be coupled to each respective one of the lines 421. The coupling can occur while lines 421 are payed out, or the deployment devices may be stopped each time an attachment point of a line 421 is revealed for coupling of tethers 446. In at least one embodiment, each of the tethers 446 has approximately the same length. The tethers 446 are coupled to each of the lines 421 at intervals along the lines 421 during deployment. For instance, the tethers 446 may be spaced 50-100 meters in at least one embodiment, though examples are not so limited. In at least one embodiment, a tether is coupled to two lines such as the lines 421-1 and 421-2 to maintain a particular distance between the lines, but is not coupled to other lines, such as the line 421-3. For instance, each one of the plurality of tethers 446 need not be coupled to each of the plurality of lines 421.

The lines 421 include attachment points where the tethers 446 are attached during deployment in at least one embodiment. Tethers 446 can be attached to lines 421 with attachment devices. Example attachment devices include, but are not limited to, carabiner-type connections, such that the tethers 446 have loops with spring-loaded gates on them for coupling to the attachment point. Other types of attachment hardware can be used. The tethers 446, in at least one embodiment, can be coupled to the spreading devices 442 discussed further herein. The tethers 446 may be coupled to the spreading devices 442 in a same or different manner as the tethers 446 are coupled to the attachment points. The tethers 446 can be coupled to the spreading devices 442 before or after deployment of the lines 421. While three tethers 446 are illustrated, more or fewer tethers 446 may be present.

In at least one embodiment, the spread of lines 421 of OBNs 455 includes a storage configuration. The storage configuration, for example, can be similar to the deployment configuration. For instance, the storage configuration can be an assembled or partially assembled "carpet" with lines, OBNs, and some or all tethers attached while in the storage configuration. In such a storage configuration, the spread of lines 421 of OBNs 455 is present on a deployment device or devices with tethers 446 attached such that tethers 446 do not need to be attached during deployment. For instance, the storage configuration can be deployed from one or more deployment devices aboard the marine vessel as the assembled or partially assembled carpet. In another embodiment, the storage configuration can include components such as lines and OBNs, with the portion including the tethers being assembled during deployment. A plurality of floatation devices 444-1, 444-2, 444-3, 444-4, 444-5, 444-6, 444-7, 444-8, 444-9 are coupled to lines 421, OBNs 455, or both. The floatation devices 444 become less buoyant to allow the lines 421 (and the associated OBNs 455) to sink and become more buoyant to float the lines 421 (and the associated OBNs 455) or otherwise urge lines 421 toward the surface of the water. For instance, gas lines in the lines 421 can be used to inflate flotation devices 444 coupled to the lines 421 during deployment and/or positioning of the 2D grid of OBNs. The gas can be air, carbon dioxide, nitrogen, or another type of gas. The inflation selectively provides positive buoyancy for the lines 421. Floatation devices 444 may be coupled to lines 421, OBNs 455, or both, before, during, or after deployment of the lines 421 of OBNs 455. Examples of floatation devices 444 include inflatable volumes such as balloons, air bags, or the air lines themselves, which can be external to or internal to the lines 421. The depiction in FIG. 4 illustrates the flotation devices 444 as balloons external to the lines 421. For those embodiments in which the floatation devices 444 comprise gas lines within the lines 421, the gas lines can be inflated or expanded to increase the buoyancy of the lines 421 and deflated to decrease the buoyancy of the lines 421.

During deployment, spreading apparatuses 442-1, 442-2 can tension the seismic spread of the 2D grid of OBNs. Such spreading apparatuses 442 include marine vessels or other spreading apparatus such as paravanes (also known as doors or deflector doors). In at least one embodiment, spreading apparatuses 442 maintain a spread of the 2D grid of OBNs such that OBNs 455 maintain substantially consistent spacing. In at least one embodiment, the spread of the 2D grid of OBNs is maintained by a force from the marine vessel and a chase vessel at the back of the 2D grid of OBNs, as well. The spreading apparatuses 442 can provide a force to spread the grid in a crossline direction, while the tethers 446 can provide an opposing force to prevent the grid from spreading beyond a desired geometry when the spreading apparatus 442 apply force thereto. In at least one embodiment, the spreading apparatuses 442 are coupled to at least one of the tethers 446 after deployment thereof, with the spreading apparatuses 442 maintaining a spread of lines 421 via the tethers 446.

Subsequent to the desired length of the lines 421 and the number of OBNs 455 reaching the fluid volume, the floatation devices 444 are deflated via the gas lines. For example, the flotation devices 444 can be vacuumed empty via the gas lines. As the lines 421 sink, a control line (not illustrated in FIG. 4) is payed out, for instance via a winch, from the marine vessel at a rate that maintains the uniform seismic spread spacing of the OBNs 455 but allows the lines 421 to descend. Spreading apparatuses 442, in at least one embodiment, continue to maintain the spread of the 2D grid of OBNs as lines 421 descend and as lines 421 are submerged in the fluid volume. In at least one embodiment, the continued maintenance of the spread of the 2D grid is done through the use of spreading devices 442, tension created by the marine vessel, and tension created by a chase vessel behind the 2D grid of OBNs. For instance, a force can be applied to four sides of the spread to achieve a uniform spread. In such an example, spreading devices 442 pull the sides of the spread, while a chase vessel pulls the rear of the spread and the marine vessel pulls the front. Alternatively, a drag device can be attached to the distal end of lines 421 to pull the rear of the spread against the forward motion of the marine vessel.

To recover the 2D grid of OBNs 455, for example after data collection by the OBNs 455 has been completed, the floatation devices 444 can be inflated via the gas lines to bring the lines 421 to the surface of the fluid volume. In at least one embodiment, gas-filled canisters, such as carbon dioxide canisters, can be used to inflate the floatation devices 444, for instance if gas lines are not available or functioning. For instance, the canisters may include a sharp, hollow tube that pierces the seal on the canister when a particular depth is reached. In at least one embodiment, a canister can be instructed to pierce the seal itself at a particular depth or a timer can be used to pierce the seal in the event communication is lost. In at least one embodiment, the canister can be directed to release gas into the floatation device in response to a command from the vessel or other control device. The canisters, in at least one embodiment, are located within a threshold distance of the floatation devices. In at least one embodiment, the canisters are in fluid communication with the floatation devices; for instance, the canisters are connected to the flotation devices with a tube. In another embodiment, the canisters are directly injected into the floatation device.

The recovery of the lines 421 can be the reverse of deployment of the lines 421. For instance, the control line that was payed out from the marine vessel is recovered as the lines 421 are brought to the surface of the fluid volume. In at least one embodiment, the control line that was payed out from the marine vessel remains coupled to the spread while it is deployed. In another embodiment, the control line that was payed out is disconnected upon completion of deployment and reconnected, for instance by a marine vessel, subsequent to the lines 421 being floated to the surface.

The lines 421 and associated OBNs 445 are returned to the marine vessel using the deployment devices and the tethers 446 are removed during retraction. For example, attachment devices, such as carabiners or d-link-style threaded links can be pulled off during retraction or deployment to attach or detach the tethers 446. In at least one embodiment, as a first set of tethers 446 arrive on the marine survey vessel deck during retraction, the deployment devices are stopped, and the attachment devices are removed. The deployment devices are then restarted. The tethers 446 are not removed in an example in which the 2D grid of OBNs 455 was deployed as an intact "carpet" of OBNs 455. In such an example, the 2D grid of OBNs 455 is retracted as a whole, including tethers 446.

Figure 5:
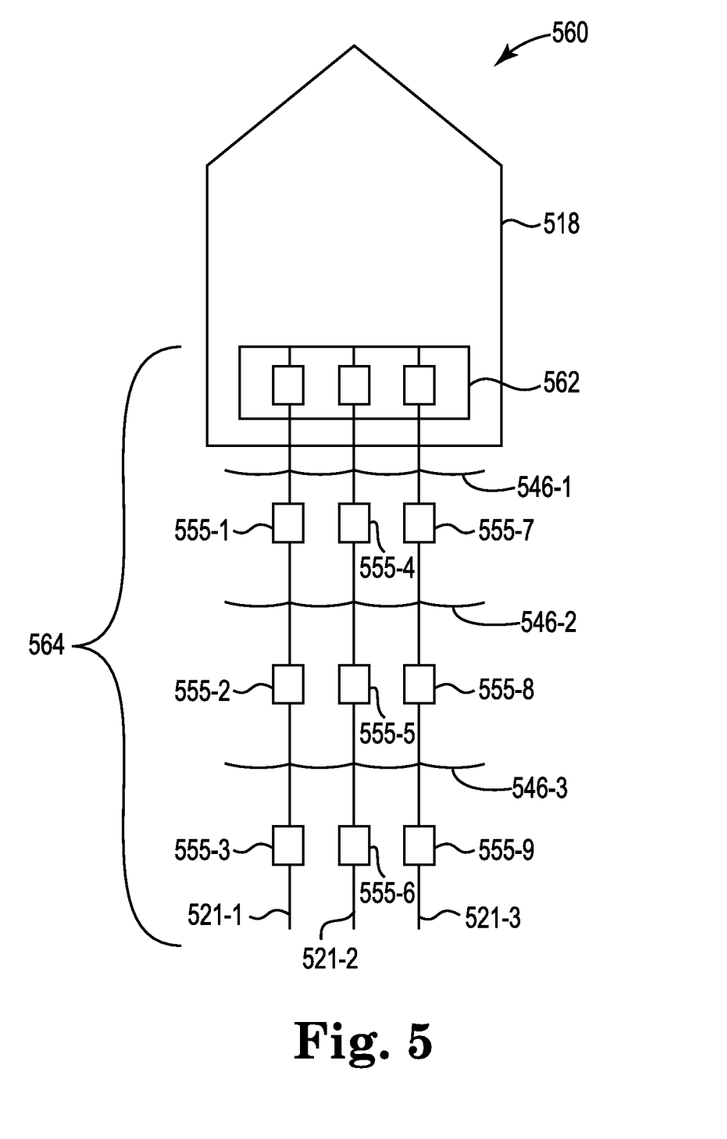
FIG. 5 is an exemplary embodiment of a system for OBN deployment including a grid of ocean bottom nodes deployed using a deployment device located on a marine vessel.

FIG. 5 is an exemplary embodiment of a system 560 for OBN deployment including a grid 564 of OBNs 555 deployed using a deployment device 562 located on a marine vessel 518. In such an example, the OBNs 555 are deployed as a "carpet". The system 560 includes the grid 564 of OBNs 555, with the grid 564 including a plurality of lines 521 each comprising the OBNs 555. The grid 564 also includes a plurality of tethers 546 coupling the lines 521. The tethers 546 are spaced a particular distance from one another. In at least one embodiment, the grid 564 includes floatation devices for sinking and urging of the grid 564 to the surface. In at least one embodiment, the grid 564 is a 2D grid of the OBNs 555.

During deployment of the OBNs 555, a deployment device 562 deploys the grid 564 of OBNs 555, for instance using a reel or reel-type machine, into a fluid volume. The tethers 546 are adjustable to maintain a desired spread of the grid, in at least one embodiment. For instance, dependent on a force applied to the tethers such as by a marine vessel or paravane, the spread can be widened or narrowed. A floatation device (not illustrated in FIG. 5) can be coupled to the lines 521 to deflate and sink the lines 521 while the tethers 546 maintain the desired spread. A control line may be payed out from the marine vessel 518, for instance via a winch or other device, to allow the grid 564 to reach a desired level in the fluid volume. For instance, the desired level can be a surface of a seabed.

When retraction of the grid 564 is desired, the deployment device 562 retracts the grid 564 of OBNs 555 from the fluid volume by reversing the deployment process. The floatation devices are inflated, the deployment device 562 retracts lines 512, and the control line previously payed out from marine vessel 518 is retracted. The grid 564 as a whole is returned to deployment device 562, tethers 546 included. In at least one embodiment, devices used to pull a spread of grid 564, such as marine vessels, chase vessels, or paravanes may be decoupled from lines 521, tethers 546, or other attachment points during retraction.

Figure 6:
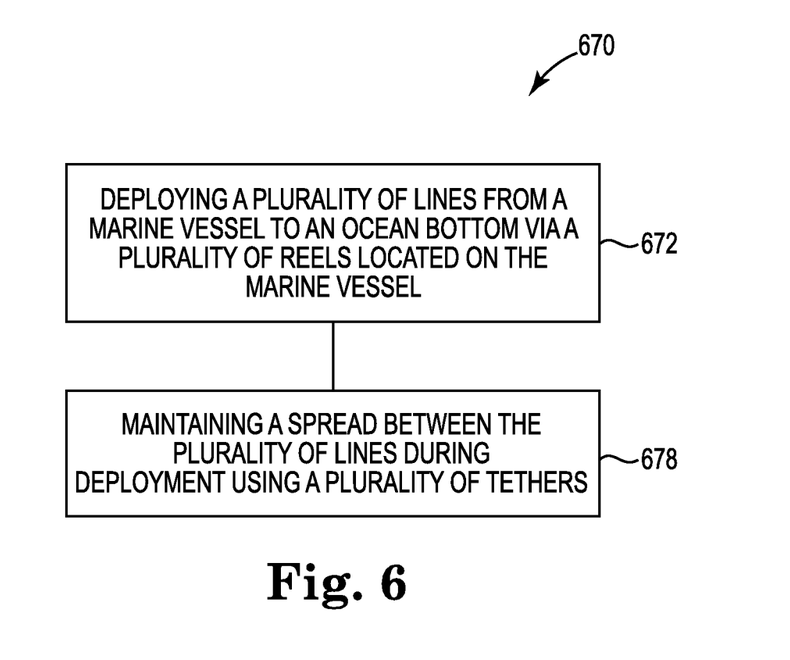
FIG. 6 is an exemplary embodiment of a method for OBN deployment.

FIG. 6 is an exemplary embodiment of a method 670 for OBN deployment. At 672, the method 670 includes deploying a plurality of lines from a marine vessel to an ocean bottom via a plurality of deployment devices such as reels located on the marine vessel. For instance, the lines are deployed off of a reel into a fluid volume. When the marine vessel is in position for deployment of the OBNs, the lines can be payed out. In at least one embodiment, as the lines leave the deck of the marine vessel, tethers can be coupled to each respective one of the lines. The coupling can occur while lines are payed out, or the deployment devices may be stopped each time an attachment point of a line is revealed for coupling of tethers. In another embodiment, tethers are coupled to the lines before deployment, so that further coupling of tethers is not necessary when deploying the lines. In such an embodiment, additional tethers can be attached during deployment.

In at least one embodiment, the method 670 includes maintaining a buoyancy of the lines as they are payed out and sinking the lines (or allowing the lines to sink) into a fluid volume upon completion of the pay out. The sinking includes, for instance using weights, reducing a buoyancy of a plurality of floatation devices coupled to the plurality of lines, or contracting a gas line running through each one of the plurality of lines. In at least one embodiment, the marine vessel can be in motion in the sail line direction during deployment. The lines are towed in the fluid volume until they are submerged or partially submerged.

Method 670, at 678, includes maintaining a spread between the lines during deployment using a plurality of tethers. The spread, for instance, includes lines of OBNs in a grid-like pattern. The tethers can couple adjacent lines of OBNs to one another to maintain a distance between the adjacent lines. Tethers may be coupled between two lines of OBNs, between and among more than two lines of OBNs, or some combination thereof.

During or following deployment, a force is applied to at least one of the lines to pull the at least one of the lines taut. For example, the force may be applied to marine vessels, paravanes, chase vessels, the marine vessel, or a combination thereof. By applying the force, desired distances between OBNs can be maintained during deployment and collection of data, resulting in more accurate data.

In at least one embodiment, a respective force is applied to a respective portion of the lines at different locations of the spread to maintain a desired spread of the lines. For instance, the marine vessel hosting the reels applies a force to the front of the deployed lines while a chase vessel applies a force to the rear of the deployed lines. Paravanes, marine vessels, or a combination of the two apply forces to outer lines to stretch and maintain a desired spread.

In at least one embodiment, while deployed, the OBNs are used in reservoir monitoring. In at least one embodiment, the OBNs are used to perform a marine seismic survey. In reservoir monitoring or seismic surveys using OBNs, acoustic energy is generated by actuation of a source towed by a marine survey vessel and travels downwardly. Some of the downwardly traveling energy reaches a subsurface layer of the ocean bottom and is reflected. The reflected energy travels upwardly and can be detected by receivers housed on the OBNs. As the OBNs receive seismic signals, the signals are recorded for later processing. The seismic signals can be recorded by the OBNs for later retrieval or can be communicated and recorded by another device such as, for example, controller 119 (FIG. 1). In some examples, both streamers and lines of OBNs can be used to record signals to be processed according to the present disclosure.

In at least one embodiment, method 670 includes retracting the lines. The retraction can be a reverse of the deployment. For example, retraction can include urging the lines to the surface, for instance subsequent to the lines having been sunk and a desired task such as reservoir monitoring completed. For instance, upon completion of collection of data from the OBNs, the lines are floated for retraction. Urging the lines to the surface can include expanding gas lines in the lines or inflating flotation devices. During retraction, a control line that was payed out from a marine vessel during sinking of the lines may be returned to the vessel along with the lines. In at least one embodiment, during retraction, the tethers are decoupled from the lines while returning the lines to the marine vessel. The decoupling can be done as the deployment devices are moving, or the deployment devices may be stopped, tethers removed, and the deployment devices restarted. In another embodiment in which the lines were deployed while tethered together, the tethers remain coupled to the lines during retraction and return to the reel.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment.

Thus, the following claims are hereby incorporated into the Detailed Description, with each claim standing on its own as a separate embodiment.

What is claimed is:

1. A system, comprising:
a first deployment device configured to be located on a marine vessel;
a second deployment device configured to be located on the marine vessel;
a first line configured to be coupled to the first deployment device and to a first plurality of ocean bottom nodes (OBNs);
a second line configured to be coupled to the second deployment device and to a second plurality of OBNs;
a plurality of tethers configured to be coupled between the first line and the second line at intervals along the first line and the second line;
a plurality of floatation devices, each configured to be coupled to a respective OBN or to at least one of the first and second lines; and
a gas line running through at least one of the first and second lines and configured to facilitate inflation of the plurality of floatation devices;
wherein the first deployment device and the second deployment device are configured to deploy and retract the first line and the second line simultaneously.

2. The system of claim 1, wherein the first and second lines and the plurality of tethers are further configured such that the plural tethers may be coupled between the first line and the second line during deployment of the first line and the second line.

3. The system of claim 2, further comprising an apparatus configured to be coupled to at least one of the plurality of tethers, the apparatus further configured to maintain a spread of the first line and the second line via the at least one of the plurality of tethers.

4. The system of claim 3, wherein the apparatus comprises a different marine vessel.

5. The system of claim 3, wherein the apparatus comprises a paravane.

6. The system of claim 2, further comprising an apparatus configured to be coupled to at least one of the plural tethers, the apparatus further configured to maintain a spread of the first line and the second line via the at least one of the plural tethers.

7. The system of claim 1, wherein:
the first deployment device is a reel configured to deploy and retract the first line; and
wherein the first line is negatively buoyant.

8. The system of claim 1, further comprising a gas line running through the first line configured to expand to provide positive buoyancy for the first line.

9. The system of claim 1, wherein the first and second lines and the plurality of tethers are further configured such that the plural tethers may be coupled between the first line and the second line during deployment of the first line and the second line.

10. The system of claim 1, wherein the first deployment device is a reel configured to deploy and retract the first line.

11. A method, comprising:
deploying a plurality of lines from a marine vessel, wherein each of the lines includes a respective plurality of ocean bottom nodes (OBNs);
maintaining a spread between the lines during deployment using a plurality of tethers coupled between adjacent ones of the lines at intervals along the lengths of the lines and using one or more paravanes or one or more additional vessels to pull the tethers taut; and
retracting the lines, wherein the retracting comprises urging the lines toward the surface of the ocean using a gas line running through at least one of the lines to inflate a plurality of floatation devices coupled to the at least one line or to respective ones of the OBNs.

12. The method of claim 11, further comprising:
coupling the tethers to the lines as the lines are being deployed from the marine vessel.

13. The method of claim 12, wherein the deployment further comprises:
the marine vessel applying a force to the front of the lines while a chase vessel applies a force to the rear of the lines.

14. The method of claim 11, further comprising reducing the buoyancy of the floatation devices to allow the lines to sink.

15. The method of claim 14, wherein reducing the buoyancy comprises deflating one or more of the flotation devices.

16. A system, comprising:
a line configured to be coupled to a plurality of ocean bottom nodes (OBNs);
a plurality of floatation devices, each configured to be coupled to a respective OBN or to the line; and
a gas line running through the line and configured to inflate the plural floatation devices.

17. The system of claim 16, further comprising a reel configured to deploy and retract the line into and from a fluid volume.

18. The system of claim 16, further comprising a plurality of the lines configured to form a two-dimensional (2D) grid of the OBNs when deployed in a fluid volume.

19. The system of claim 18, further comprising a plurality of tethers configured to be coupled between the plural lines at intervals along the plural lines to maintain a desired spread of the grid.

20. The system of claim 16, wherein the gas line is configured to selectively inflate and deflate the plural floatation devices to facilitate retrieval and deployment of the line, respectively.

21. A system, comprising:
a first deployment device configured to be located on a marine vessel;
a second deployment device configured to be located on the marine vessel;
a first line configured to be coupled to the first deployment device and to a first plurality of ocean bottom nodes (OBNs);
a second line configured to be coupled to the second deployment device and to a second plurality of OBNs;
a plurality of tethers configured to be coupled between the first line and the second line at intervals along the first line and the second line; and
a gas line running through at least the first line configured to expand to provide positive buoyancy for at least the first line;
wherein the first deployment device and the second deployment device are configured to deploy and retract the first line and the second line simultaneously.

* * * * *